United States Patent
Shultz

(10) Patent No.: US 6,343,504 B1
(45) Date of Patent: Feb. 5, 2002

(54) APPARATUS AND METHODS FOR TESTING TRANSMISSIONS

(75) Inventor: Duane E. Shultz, Pulaski, WI (US)

(73) Assignee: Hicklin Engineering, L.C., Des Moines, IA (US)

( * ) Notice: Subject to any disclaimer, the term of this patent is extended or adjusted under 35 U.S.C. 154(b) by 1272 days.

(21) Appl. No.: 08/601,724

(22) Filed: Feb. 15, 1996

Related U.S. Application Data

(63) Continuation of application No. 08/367,941, filed on Jan. 3, 1995, now Pat. No. 5,537,865.

(51) Int. Cl.[7] .............................................. G01M 15/00
(52) U.S. Cl. ...................................................... 73/118.1
(58) Field of Search .............................. 73/118.1, 162, 73/168, 862, 865.6, 865.9

(56) References Cited

U.S. PATENT DOCUMENTS

| | | | | |
|---|---|---|---|---|
| 3,712,127 A | * | 1/1973 | Peterson ........................ | 73/118 |
| 4,274,278 A | * | 6/1981 | Patterson ......................... | 73/7 |
| 4,356,724 A | * | 11/1982 | Ayoub et al. .................. | 73/118 |
| 4,391,131 A | * | 7/1983 | Scourtes ........................ | 73/118 |
| 4,468,958 A | * | 9/1984 | Takeshita ....................... | 73/118 |
| 4,520,659 A | * | 6/1985 | Lucia et al. ................... | 73/118 |
| 4,592,228 A | * | 6/1986 | Lucia ............................. | 73/118 |
| 4,732,036 A | * | 3/1988 | Weeder ......................... | 73/118.1 |
| 4,805,446 A | * | 2/1989 | Brown ........................... | 73/118.1 |
| 4,862,736 A | * | 9/1989 | Treitz ............................. | 73/117 |
| 4,898,026 A | * | 2/1990 | Damitz ........................... | 73/118.1 |
| 5,023,499 A | * | 6/1991 | Kuwahara ....................... | 310/105 |
| 5,078,238 A | * | 1/1992 | Okada ............................. | 188/271 |
| 5,085,071 A | * | 2/1992 | Mizushina et al. ........... | 73/118.1 |
| 5,086,648 A | * | 2/1992 | Sano et al. ..................... | 73/118.1 |
| 5,097,699 A | * | 3/1992 | Sano et al. ..................... | 73/118.1 |
| 5,142,903 A | * | 9/1992 | Mizushina et al. ........... | 73/118.1 |
| 5,144,834 A | * | 9/1992 | Sano et al. ..................... | 73/118.1 |
| 5,154,623 A | * | 10/1992 | Kuwahara ....................... | 188/164 |
| 5,219,050 A | * | 6/1993 | Kubomiya ..................... | 188/267 |

* cited by examiner

Primary Examiner—Eric S. McCall
(74) Attorney, Agent, or Firm—Zarley, McKee, Thomte, Voorhees & Sease PLC

(57) ABSTRACT

This invention pertains to transmission testers, and specifically to automatic transmission testers, and methods for their use. The headstock is mounted for pivotation about a vertical axis. A novel eddy current brake provides active control of loading of the transmission while the transmission is being tested. The prime mover is preferably an electric motor, with motor controls, adapted to temporarily suspend acceleration of the speed when the transmission shifts gears.

56 Claims, 9 Drawing Sheets

FIG. 4
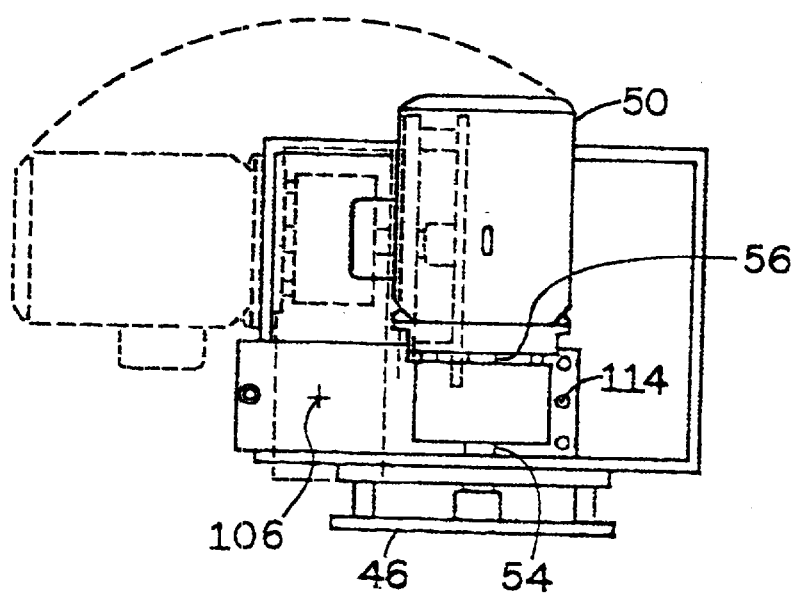
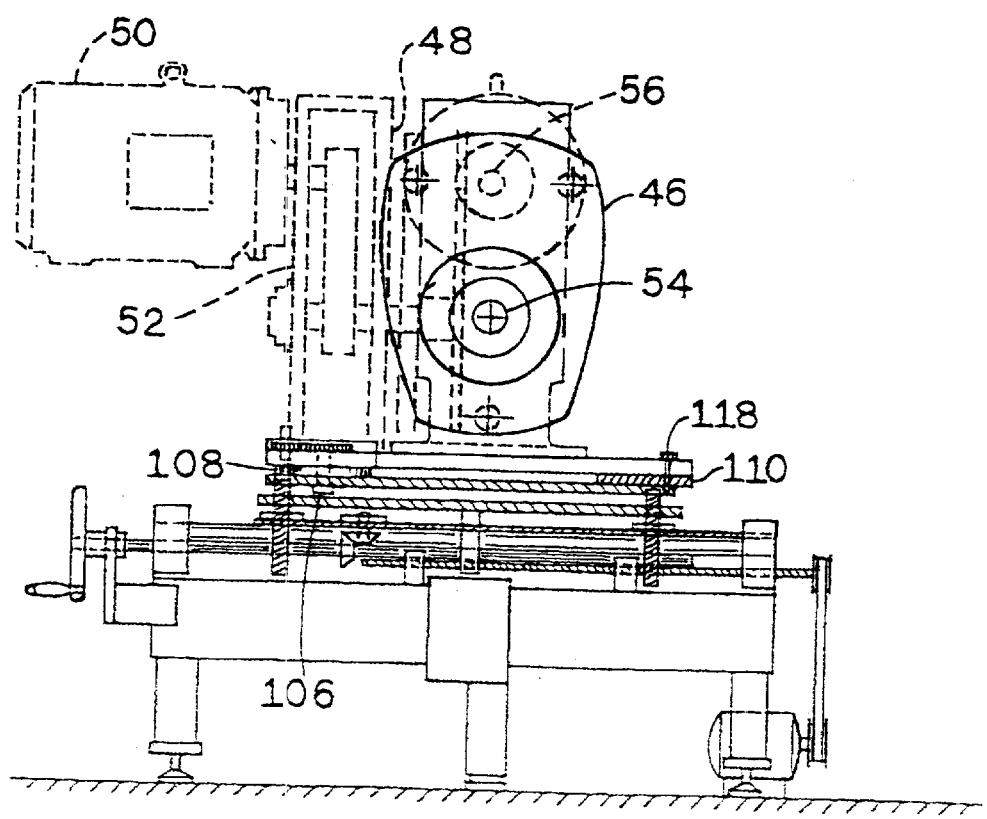
FIG. 5

# APPARATUS AND METHODS FOR TESTING TRANSMISSIONS

This a application is a continuation of Ser. No. 08/367,941 filed Jan. 3, 1985 now U.S. Pat. No. 5,537,865 issued Jul. 23, 1996.

FIELD OF THE INVENTION

This invention relates generally to transmission testers and methods of testing transmissions, especially rebuilt automatic transmissions for automobiles and trucks. More specifically, the invention is directed to transmission test apparatus to which an automatic transmission may be mounted, in driven relation to, in combination, a prime mover and a braking apparatus, for simulating driving conditions in a vehicle, and to novel braking apparatus.

BACKGROUND OF THE INVENTION

Automatic transmission test stands are generally known. Typical of such test stands is the test stand taught in, for example, U.S. Pat. No. 4,732,036 Weeder. Weeder teaches a test stand wherein the headstock, which receives the transmission thereon while the transmission is being tested, can move transverse to the tailstock shafts, as well as being able to move vertically. The prime mover internal combustion engine also can move transversely as well as vertically, but on supports separate from the headstock supports.

U.S. Pat. No. 4,356,724 Ayoub et al teaches using an electric motor as the prime mover, as does U.S. Pat. No. 5,142,903 Mizushina et al. Ayoub et al show the electric motor fixedly secured to a support remote from the headstock support. Mizushina et al do not show the mounting support for the electric motor. Neither reference teaches any electronic apparatus for conditioning the electricity supplied to the electric motor.

In all the references known to the inventor, only flywheel-type inertia devices are taught as load devices, for applying a load to the engine during the test procedure.

No reference known to the inventor provides a single test stand for testing automatic transmissions wherein the headstock is mounted to the main frame with sufficient freedom of movement to mount and test all of (1) rear wheel drive transmissions, (2) transverse mounted front wheel drive transmissions, and (3) longitudinally mounted front wheel drive transmissions.

No reference teaches or suggests mounting an electric motor as the prime mover to the same support that mounts the headstock which receives the transmission. Neither does any reference teach using electric brakes.

It is an object of this invention to provide an improved transmission tester, and methods of use, wherein an electric motor is provided as the prime mover, fixedly secured for adjusting movement relative to a braking unit, in combination with the headstock and corresponding transmission secured to the headstock.

It is another object to provide a transmission tester, and methods of use, wherein an electric motor is provided as the prime mover, and is adapted to temporarily suspend acceleration when the transmission shifts gears.

It is a further object to provide a transmission tester wherein the headstock can pivot about a vertical axis, to thereby receive a longitudinally mounted transaxle, as well as to receive transversely mounted transaxles and rear wheel drive transmissions.

It is another object to provide a load device, for providing an active load simulating the deadweight load of a range of vehicle weights.

It is a more specific object to provide a load device adapted to apply a mechanical resistance load within a range of available torque values, including selecting one or more torque values as part of testing each transmission.

It is a still more specific object to provide an eddy current brake as an active load device, for applying resistance torque to the transmission while the transmission is being tested.

SUMMARY OF THE DISCLOSURE

The invention generally comprehends improvements in transmission testing apparatus, including use of eddy current brakes, pivoting the headstock about a substantially vertical axis, and providing enhanced electrical controls that allow use of an electric motor prime mover while simulating the loading characteristics of an internal combustion engine.

Some of the objects are obtained in a first family of embodiments comprehending a transmission tester for testing vehicular transmissions, the transmission tester comprising a main frame; a prime mover, for providing driving energy to a transmission to be tested; a headstock plate adapted to receive thereon a transmission to be tested, the headstock plate being supported from the main frame by a support, for pivoting the headstock plate about a first axis; and braking apparatus, supported from the main frame, the braking apparatus including a shaft journalled for rotation about a second axis substantially perpendicular to the first axis, and extending generally toward the headstock plate, for engaging an output shaft of the transmission to be tested, and for thereby applying braking energy to the transmission.

In preferred embodiments, the first axis is substantially vertical and the second axis is substantially horizontal. The support comprises a headstock frame, supported from the main frame, between the main frame and the headstock plate, the headstock frame being mounted for pivotation about the first axis, thereby to pivot the headstock plate about the first axis, with the headstock plate being adapted to face in a first direction along an imaginary line extending toward the brake unit, and to pivot about the first axis to thereby face in a second direction transverse to the imaginary line extending toward the brake unit. Accordingly, the headstock plate can pivot about an included angle, between the first and second directions, of at least about 90 degrees.

The transmission tester preferably has opposing first and second ends, and a length therebetween, the prime mover comprising an electric motor, mounted to the headstock frame, the headstock frame, with the electric motor thereon, being supported from the main frame for movement both of the combination of the headstock frame and the electric motor in a direction having a vertical component, and of the combination of the headstock frame and the electric motor in a direction having a transverse horizontal component relative to the length of the transmission tester.

In preferred embodiments, the prime mover comprises an electric motor, mounted for pivotation with respect to the first axis, and includes an inverter adapted to vary the speed of the electric motor, and to temporarily suspend acceleration of the speed of the electric motor when a transmission being tested shifts gears.

In highly preferred embodiments, the prime mover comprises an electric motor mounted to the headstock frame, and the headstock plate is mounted to the headstock frame, for pivoting both the prime mover and the headstock plate, in combination, with respect to the first axis.

The braking apparatus preferably comprises an eddy current brake.

In a second family of embodiments, the invention comprehends a transmission tester for testing vehicular transmissions, the transmission tester comprising a main frame; a prime mover, for providing driving energy to a transmission to be tested; a headstock plate, supported from the main frame, for receiving thereon transmissions to be tested; and braking apparatus, supported from the main frame, the braking apparatus comprising a connecting shaft journalled for rotation about a first axis, and for applying braking energy to a transmission to be tested, the braking apparatus being adapted to dynamically apply a resistance torque which varies within a range of vehicle deadweight loads, and braking loads, simulating a correspondingly varying range of vehicle deadweight loads, and braking loads, preferably comprising an eddy current brake.

In preferred transmission testers of the invention, the eddy current brake has a longitudinal axis defining a length, a shaft extending along the longitudinal length of the brake, a stator, including at least first, second, third, and fourth electromagnetic stator coils disposed in side-by-side relationship with each other about the shaft, and an end pole associated with each electromagnetic stator coil, and a rotor secured to the shaft, for rotation with the shaft and adjacent the end pole, with a gap between the rotor and the end poles, the electromagnetic stator coils being wired in series, from the first coil to the fourth coil, preferably in the sequence of first, second, third, and fourth coils.

In some embodiments, the at least first, second, third, and fourth electromagnetic stator coils comprise a first front set of coils, the eddy current brake further comprising a corresponding second rear set of electromagnetic stator coils disposed rearwardly of the first front set, and in side-by-side relationship with each other about the shaft, the second set of coils being wired in parallel with the first set of coils, and, at least in part, in series with each other.

Preferably, the braking apparatus further comprises a direct current motor control adapted to receive alternating current up to 230 volts, to transform the alternating current to a lower voltage of 96 volts alternating current, to convert the lower voltage alternating current to 96 volts direct current, and to supply the 96 volts direct current to the electromagnetic stator coils. The braking apparatus may further include a potentiometer adapted to regulate and control amperage delivered from the direct current motor control to the electromagnetic stator coils, thereby to control, and optionally vary dynamically, during testing of a given transmission, amperage, and thus the load applied to the transmission by the braking apparatus.

Further to preferred embodiments, the eddy current brake may comprise at least three electromagnetic stator coils effective to apply braking energy to a transmission to be tested, the eddy current brake and an electrical control unit, in combination, being adapted to apply electrical energy to at least three, more preferably all, of the at least three electromagnetic stator coils at the beginning of applying energy to the eddy current brake to thereby apply braking torque to a transmission to be tested.

The prime mover preferably comprises an electric motor, and includes an inverter adapted to vary the speed of the electric motor, and to temporarily suspend acceleration of the speed of the electric motor when a transmission being tested shifts gears.

It is also preferred that the transmission tester of the invention include a mechanical stall brake, for mechanically locking the connecting shaft of the eddy current brake against rotation about the first axis.

In a third family of embodiments, the invention comprehends a method of testing a vehicular transmission. The method comprises the steps of providing a transmission tester having a main frame, a prime mover, for providing driving energy to a transmission to be tested, a headstock plate adapted to receive thereon a transmission to be tested, the headstock plate being supported from the main frame, for pivoting the headstock plate about a first axis, and braking apparatus, supported from the main frame, the braking apparatus including a shaft journalled for rotation about a second axis substantially perpendicular to the first axis, and extending generally toward the headstock plate, for engaging an output shaft of the transmission to be tested, and for thereby applying braking energy to the transmission; mounting, to the headstock plate, a transmission to be tested; and as necessary, pivoting the headstock plate about the first axis to bring the output shaft on the transmission into alignment with the shaft on the braking apparatus.

Preferably, the support comprises a headstock frame, supported from the main frame, between the main frame and the headstock plate, the headstock frame being mounted for pivoting about the first axis, the method thereby comprising pivoting the headstock frame to effect the pivoting of the headstock plate about the first axis.

Also preferably, the method comprises facing the headstock plate in a first direction along an imaginary line extending toward the brake unit, and pivoting the headstock plate about the first axis to thereby face in a second direction transverse to the line extending toward the brake unit, thereby describing an included angle between the first and second directions of at least about 90 degrees.

In some preferred embodiments, the support comprises a headstock frame, supported from the main frame, between the main frame and the headstock plate, the headstock frame being mounted for pivotation about the first axis, the transmission tester having first and second ends, and a length therebetween, the prime mover comprising an electric motor, mounted to the headstock frame, the headstock frame, with the electric motor thereon, being supported from the main frame for both movement of the combination of the headstock frame and the electric motor in a direction having a vertical component and movement of the combination of the headstock frame and the electric motor in a direction having a transverse horizontal component relative to the length of the transmission tester, the method further comprising pivoting the combination of the headstock frame and the electric motor about the first axis, and moving the combination of the headstock frame and the electric motor in one or more directions comprising movement having both vertical and horizontal components.

In other embodiments, the prime mover comprises an electric motor, the method further comprising supplying electric power to the electric motor and thereby driving a transmission being tested at an accelerating speed, including conditioning the electric power in an inverter and thereby increasing the speed of the electric motor, and, through the inverter, temporarily suspending acceleration of the speed of the electric motor when the transmission shifts gears.

It is preferred that the braking apparatus comprise an eddy current brake, adapted to dynamically apply a resistance torque to the transmission, wherein the load varies within a range of available torque values, simulating a correspondingly varying range of vehicle deadweight loads, and braking loads, the method comprising selecting at least one torque deadweight value, and optionally a dynamically variable set of braking loads as part of testing each transmission, and applying the selected loads to the transmission, as resistance torque, using eddy current power.

As to pivotation about the first axis, it is preferred that the prime mover comprise an electric motor, mounted to the headstock frame, and the headstock plate being mounted to the headstock frame, and that the method include pivoting both the prime mover and the headstock plate, in combination, with respect to the first axis.

In some applications of the invention, the transmission tester includes a stall brake, and the method includes applying driving power from the prime mover to the transmission mounted to the headstock plate, and simultaneously applying the stall brake, for performing e.g. a stall speed test on the transmission.

In a fourth family of embodiments, the invention comprehends a method of testing vehicular transmissions, the method comprising the steps of providing a transmission tester having a main frame, a prime mover, for providing driving energy to a transmission to be tested, a headstock plate adapted to receive thereon a transmission to be tested, the headstock plate being supported from the main frame, and braking apparatus, supported from the main frame, the braking apparatus including a connecting shaft journalled for rotation about a first axis, and for applying braking energy to a transmission, the braking apparatus comprising an eddy current brake; mounting, to the headstock plate, a transmission to be tested; connecting an output element, such as a shaft, of the transmission to the connecting shaft of the braking apparatus; applying energy from the prime mover to thereby drive the transmission; and applying electrical energy to the braking apparatus and thereby applying eddy current power, as a braking torque, to the transmission output element.

Preferably, the method includes receiving, in an electrical control unit, alternating current up to 230 volts, transforming the alternating current to 96 volts, converting the 96 volt alternating current to 96 volts direct current, and applying the 96 volt direct current to the eddy current brake to thereby apply eddy current power to the transmission, optionally including controlling amperage to the transformer, and thus to the eddy current brake, and thereby applying a varying amount of braking torque to the transmission.

In preferred embodiments, the eddy current brake comprises at least three electromagnetic stator coils effective to apply braking energy to the transmission, the eddy current brake and the electrical control unit, in combination, being adapted to apply electrical energy to at least three of the at least three electromagnetic stator coils at the beginning of applying energy to the eddy current brake to thereby apply braking torque to the transmission, the method including applying electrical energy, through the electrical control unit, to at least three of the at least three, preferably all, electromagnetic stator coils at the beginning of applying energy to the eddy current brake to thereby apply braking torque to the transmission.

In preferred methods, the eddy current brake has a longitudinal axis defining a length, and comprises a shaft extending along the longitudinal length of the brake, a stator, including at least first, second, third, and fourth electromagnetic stator coils disposed in side-by-side relationship with each other about the shaft, and an end pole associated with each electromagnetic stator coil, and a rotor secured to the shaft, for rotation with the shaft and adjacent end poles, with a gap between the rotor and the end poles, the method including applying electrical energy to the at least first, second, third, and fourth electromagnetic stator coils in series relationship, from the first coil to the fourth coil.

In some embodiments, the at least first, second, third, and fourth electromagnetic stator coils comprise a first front set of coils, the eddy current brake comprising a corresponding second rear set of electromagnetic stator coils disposed rearwardly of the first front set, in side-by-side relationship with each other about the shaft, the method including applying electrical energy to the second set of electromagnetic stator coils in parallel with the first set of electromagnetic stator coils, and, at least in part, in series with each other.

The braking apparatus may further comprise a direct current motor control adapted to receive alternating current up to 230 volts, to transform the alternating current to 96 volts, to convert the 96 volts alternating current to 96 volts direct current, and to supply the 96 volts direct current to the electromagnetic stator coils.

The method may further comprise regulating and controlling amperage delivered from the direct current motor control to the electromagnetic stator coils with a potentiometer.

In preferred embodiments, the prime mover comprises an electric motor, the method further comprising supplying electric power to the electric motor and thereby driving the transmission at an accelerating speed, including conditioning the electric power in an inverter and thereby increasing the speed of the electric motor, and, through the inverter, temporarily suspending acceleration of the speed of the electric motor, and thereby the speed of the transmission, when the transmission shifts gears.

In some embodiments, the transmission tester includes a mechanical stall brake, and the method includes applying the stall brake, and thereby mechanically locking the eddy current brake against rotation about the first axis.

BRIEF DESCRIPTION OF THE DRAWINGS

FIG. 4 shows a top view of the headstock frame, the headstock plate, and the electric motor, with rotation of the motor and headstock plate represented in dashed outline.

FIG. 5 shows an elevation view of the headstock frame, the headstock plate, and the electric motor, with rotation of the motor and headstock plate represented in dashed outline.

DETAILED DESCRIPTION OF THE ILLUSTRATED EMBODIMENTS

Figure 1:
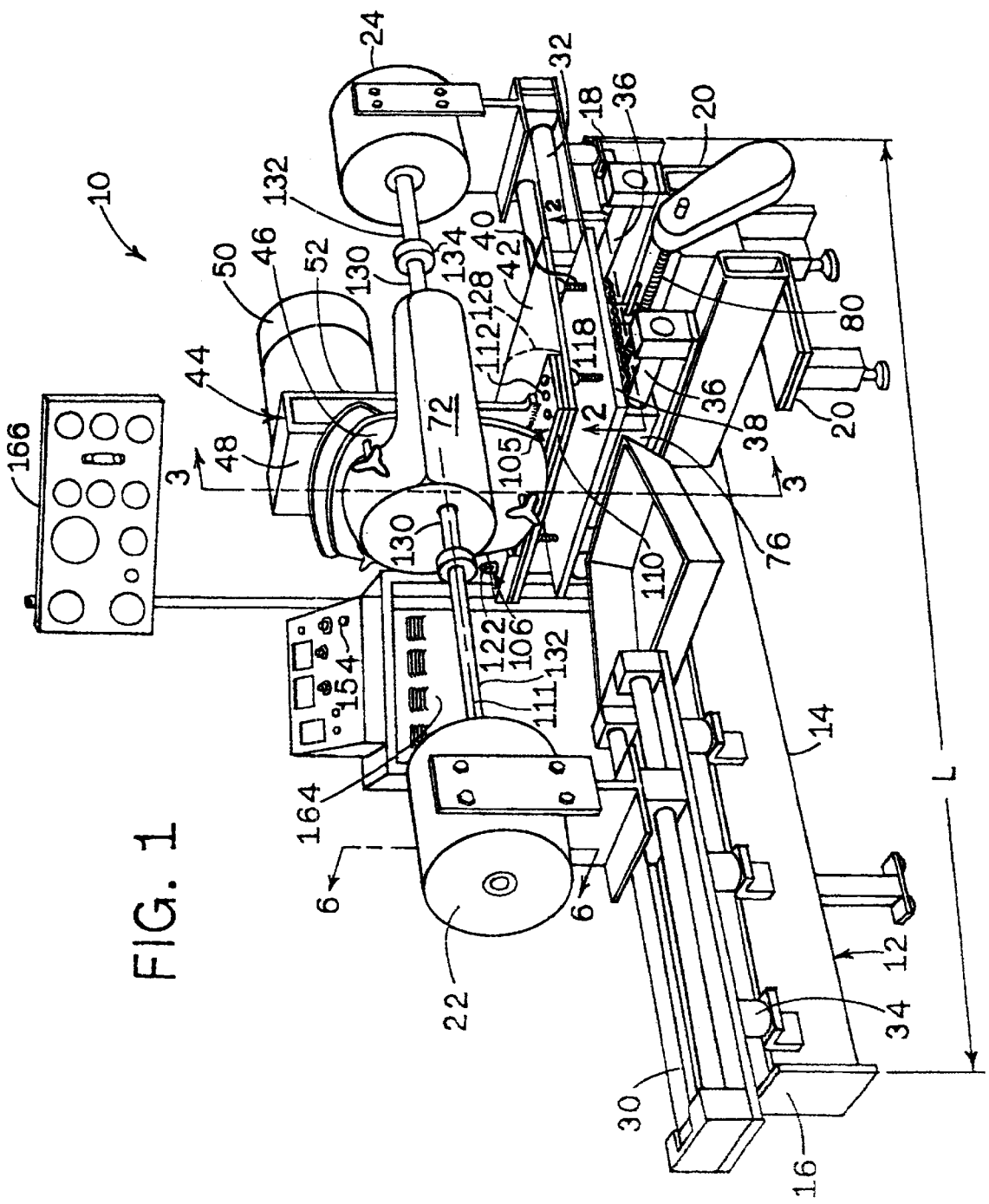
FIG. 1 shows a pictorial view of a transmission tester of this invention, with a transversely mounted transaxle mounted to the headstock.
Figure 7:
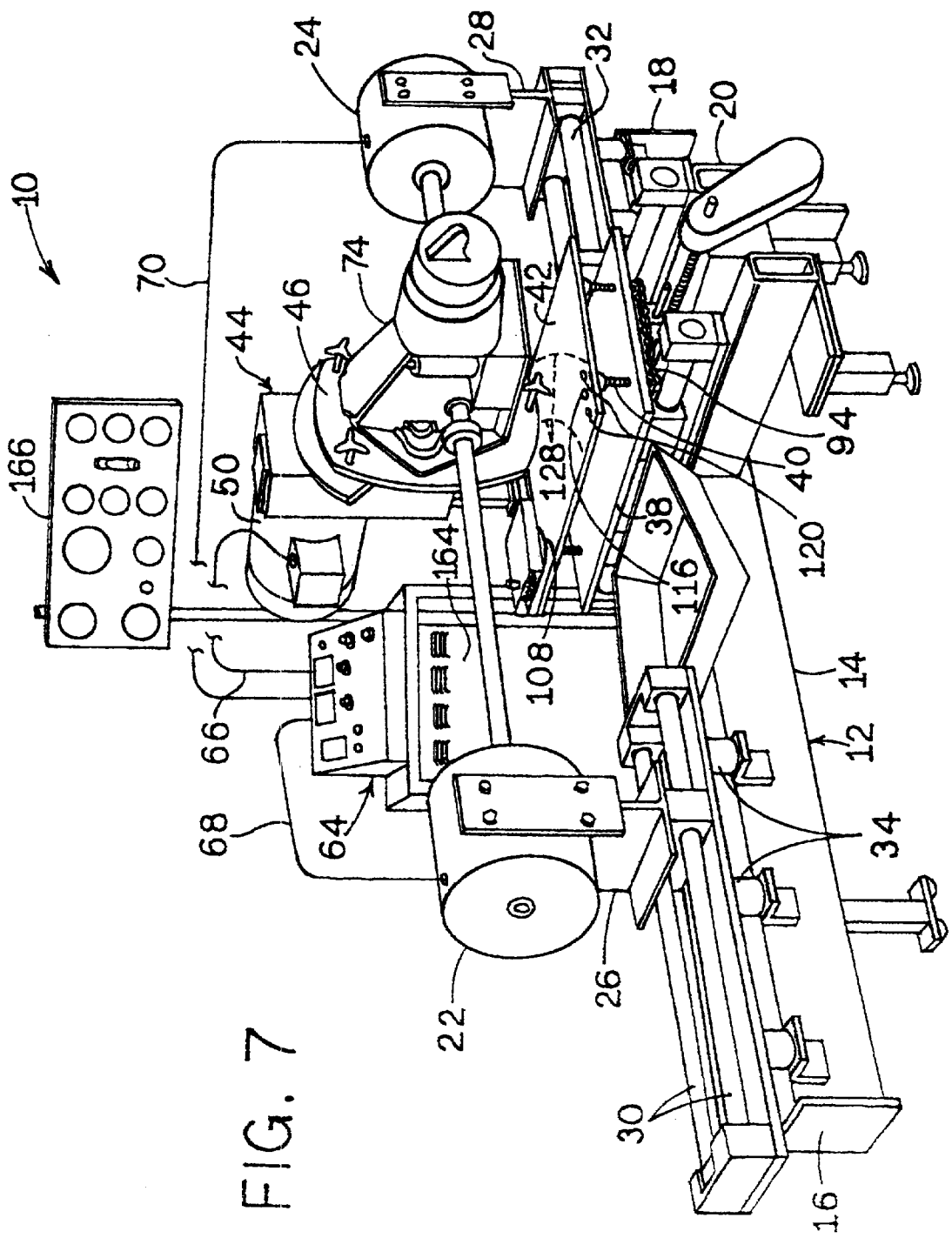
FIG. 7 shows a pictorial view of the transmission tester as in FIG. 1, with the headstock frame, including headstock plate, and motor, rotated 90 degrees to receive a longitudinally mounted transaxle.

Referring now by characters of reference to the drawings, and first to FIGS. 1 and 7, the transmission tester 10 includes a main frame 12 supported from a base such as an underlying floor (See FIGS. 3 and 5), and supporting its various operating components. The main frame includes an elongated longitudinal frame member 14 engaging the ground or other underlying support. The elongated longitudinal frame member 14 has opposing first left and second right ends 16, 18 respectively. The main frame 12 further includes a cross frame member 20 disposed between the ends 16, 18 of the elongated longitudinal member 14, the cross frame member 20 also being in engagement with the ground or other underlying support. Accordingly, the elongated longitudinal member 14 and the cross member 20, in combination, generally provide underlying support for the operating components of the transmission tester 10.

First left and second right brake units 22 and 24, respectively, are supported on corresponding first left and second right pedestals 26 and 28. The pedestals 26, 28 are slideably supported for sliding in a longitudinal direction, along the length of elongated frame member 14, on first and second pairs 30 and 32 of slide bars. Slide bars 30, 32 are supported from elongated frame member 14 by a plurality of brackets 34.

Cross frame member 20 supports a third pair of slide bars 36, which in turn support a transverse support plate 38. Four height adjustment bolts 40 support a headstock support plate 42 from the transverse support plate 38.

Headstock frame 44 is supported from the headstock support plate 42. The headstock plate 46 is secured to a first side 48 of the headstock frame 44. Electric motor 50 is secured to a second opposing side 52 of the headstock frame 44. The headstock drive shaft 54 is connected to the electric motor drive shaft 56 through pulley 58 on the motor drive shaft, pulley 60 on the headstock shaft, and connecting drive belt 62. See FIG. 3.

Referring, now to FIG. 7, an electronic control unit generally designated 64 provides power and control signals to the electric motor 50 through electric wires represented as line 66, and provides power and control signals to the brake units 22 and 24 through electric wires represented as lines 68 and 70.

A transversely mounted transaxle transmission 72 is shown mounted to the headstock plate 46 in FIG. 1. In FIG. 7, the headstock frame 44 has been rotated, along with the headstock plate 46 and electric motor 50, as will be discussed in more detail hereinafter. A longitudinally mounted transaxle transmission 74 is mounted to the so rotated headstock plate 46. A rear wheel drive transmission, not shown, can similarly be mounted to the headstock plate 46, and tested, using the general set-up shown in FIG. 1, along with appropriate transverse alignment of the headstock frame with respect to the brake unit 22.

Figure 2:
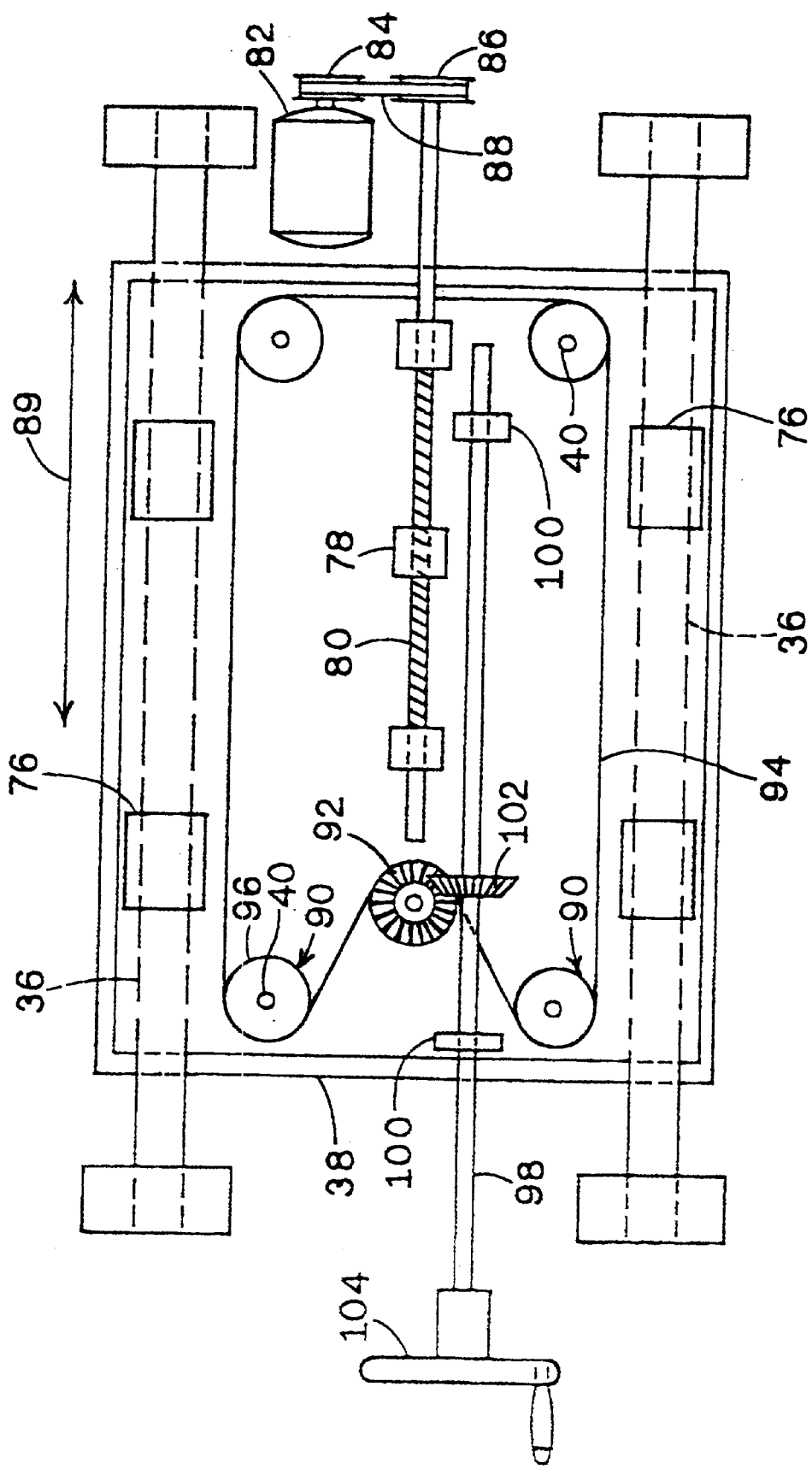
FIG. 2 shows a bottom view of apparatus for moving the headstock vertically and transversely horizontally with respect to the main frame, and is taken at 2—2 of FIG. 1.
Figure 3:
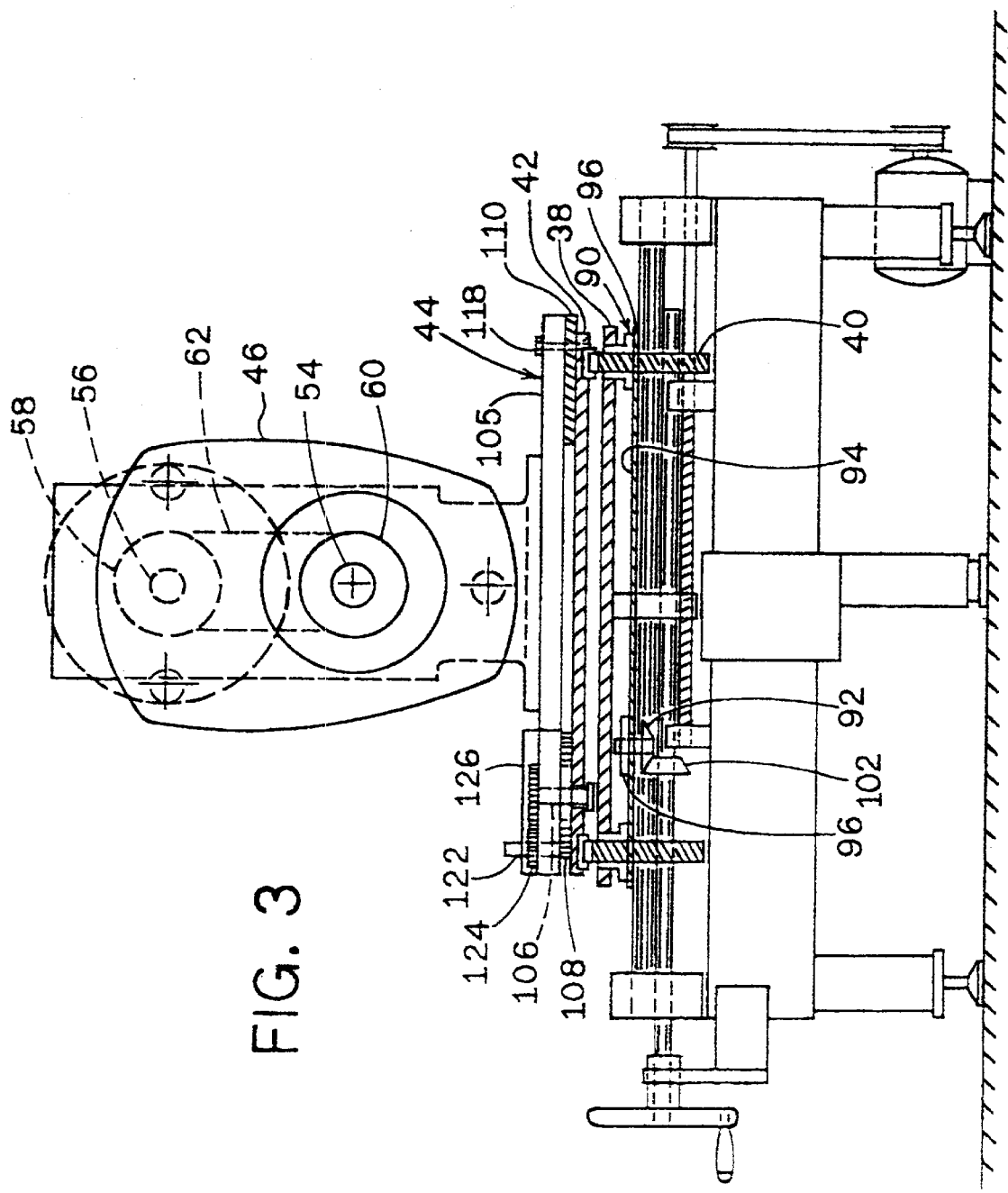
FIG. 3 shows an elevation view of the transmission tester of FIG. 1, taken at 3—3 of FIG. 1.

Referring, now, to FIGS. 1, 2, and 3, plate support bearings 76 are fixedly secured to the transverse support plate 38, and slideably engage the respective slide bars 36, for sliding movement along the lengths of the slide bars, thereby to support the transverse support plate 38 as the plate 38 moves transversely with respect to the elongated longitudinal frame member 14. Threaded bracket 78 is fixedly secured to transverse support plate 38, and receives a correspondingly threaded shaft 80. Shaft 80 is driven by motor 82, through pulleys 84 and 86, and connecting drive belt 88. As the shaft 80 is driven, the cooperating threads on shaft 80 and threaded bracket 78 drive the transverse support table 38 transversely with respect to the length "L" of the main frame 12 as indicated by the double headed arrow 89.

The four height adjustment bolts 40 are mounted to the lower surface of the transverse support plate 38 through four of the five corresponding sprocket assemblies 90. Vertical bevel gear 92 is correspondingly mounted to the lower surface of the transverse support plate 38 through the fifth sprocket assembly 90. Endless chain 94 extends around the four outer sprockets 96, in turn, and about the corresponding fifth inner sprocket 96 above the bevel gear 92. Height adjusting shaft 98 is secured to transverse support plate 38 through bearings 100. Horizontal bevel gear 102, on shaft 98 meshes with bevel gear 92, whereby the two gears turn together as the shaft 98 is turned, for example, using crank handle 104.

Turning now to FIGS. 1 and 3, the bottom member 105 of the headstock frame 44 is mounted to the headstock support plate 42, for pivotation about pivot pin 106. Bottom member 105 is supported from transverse support plate 38 through a first bearing pad 108 generally circumscribing the pivot pin 106, and a second bearing pad 110 at the end of the headstock support plate remote from the pivot pin 106. As seen in the drawings, the headstock frame 44 can pivot about pivot pin 106 from a first position shown in FIG. 1 wherein the headstock plate faces in the longitudinal direction along imaginary line 111 extending along the length "L" of the main frame, to a second position shown in FIG. 7 wherein the headstock plate faces in a direction transverse to the length "L" of the main frame, at a substantially perpendicular angle as illustrated in FIGS. 4 and 7.

Referring, now, to FIGS. 1, 4, and 7, a locator pin 112 is received, through a first hole 114 in bottom member 105, into a corresponding first locator hole 116 in headstock support plate 42 to generally locate the headstock support plate in the first position. Tie-down bolts 118 on opposing sides of locator pin 112 extend through holes, not shown, in bottom member 105 into corresponding threaded tie-down holes 120 in the headstock support plate 42. Once the headstock frame has been generally located at the first position by the locator pin 112 in holes 114, 116, the headstock frame is secured to the headstock support plate by engaging and tightening tie-down bolts 118, prior to testing a transmission. Corresponding holes 116 and 118 are located at the second position on the headstock support plate.

When the headstock frame is to be moved from the first position shown in FIG. 1 to the second position shown in FIG. 7, the tie-down bolts 118 are first disengaged from headstock support plate 42, and locator pin 112, if present in holes 114, 116, is removed. The headstock frame can then be pivoted about vertical pivot pin 106 to the second position. Pivotation can generally be effected by merely pushing on the headstock frame in the desired direction.

In the alternative, the headstock frame can be moved by engaging a wrench on stud 122, which extends from gear 124. Gear 124 engages, and thus turns gear 126. Gear 126 is secured to pivot pin 106, which is in turn secured, through a key/slot combination or the like, to the bottom member 105 of headstock frame 44. Accordingly, turning the stud 122 causes corresponding pivoting of the headstock frame about pivot pin 106. As headstock frame 44 pivots, so do the elements carried thereon, namely the headstock plate 46 and the electric motor 50. FIGS. 1 and 7 suggest the path of pivotation of bearing pad 110 as a pair of curved dashed lines 128. FIGS. 4 and 5 show the headstock frame, including headstock plate and motor in solid outline at the first location, and in dashed outline at the second location.

By leaving the locator pin 112 in hole 114 during pivotation of the headstock frame, the end of the pin 112 rides along the surface of the headstock support plate as the headstock frame is moved from the first position toward the second position. When the headstock frame reaches the second position, the locator pin 112 drops into the corresponding locator hole 116. The tie-down bolts 118 are then tightened in the corresponding holes 120 at the second position, shown in FIG. 7. With the tie-down bolts tightened, the headstock frame is ready for use in testing a transmission. Pivot pin 106, gear 126, locator pin 112, and tie-down bolts 118 are among adjustment elements which adjust the position of the headstock plate and headstock frame.

Referring, again, to FIG. 1, and with the headstock plate facing toward the left brake unit 22, a transversely mounted transaxle transmission is mounted to the headstock plate 46. The output shafts 130 of the transmission extend toward the corresponding brake units. Tailstock shafts 132 extend from the brake units 22, 24 toward the output shafts 130 and are coupled to the output shafts 130 at couplings 134.

The brake units 22, 24 are preferably eddy current brakes, with the tailstock shafts 132 being connected for corresponding rotation to the shaft 136 of the corresponding eddy current brake 22, 24.

In each eddy current brake, an array 138 of sixteen direct current electromagnetic stator coils 140 is attached to the stationary frame 142, with steel end poles 141 of the electromagnets on opposing ends 144, 146 of the array. Rotors 148 are mounted on the corresponding shaft 136 at the opposing ends 144, 146 of the array of electromagnetic stator coils 140, with a small air gap 150 between the stationary electromagnets and the rotors 148. Accordingly, the rotors 148 rotate with the shaft 136, which rotates with the corresponding tailstock shaft 132, and the output shaft 130 of the transmission. The rotors 148 are cast iron, in the form of centrifugal fans which pump cooling air through the rotors continuously. The retarding force of the brakes 22, 24 is developed by the action of the rotor 148 shearing through lines of magnetic force developed by the electromagnets 140. Heat is produced by the flow of electrical currents within the rotor and is dissipated by the flow of air through the rotor.

Accordingly, turning the output shafts 130 of the transmission causes corresponding turning of the shaft 136, and corresponding turning of the rotors 148 with respect to the electromagnets 140. As the electromagnets are energized, eddy currents in the rotors produce a mechanical retarding force acting on the rotors, and thus on the transmission. By varying the amperage of the electric power supplied to the electromagnets, as is described in more detail hereinafter, the magnitude of the braking torque applied to the transmission can be varied correspondingly.

Figure 8:
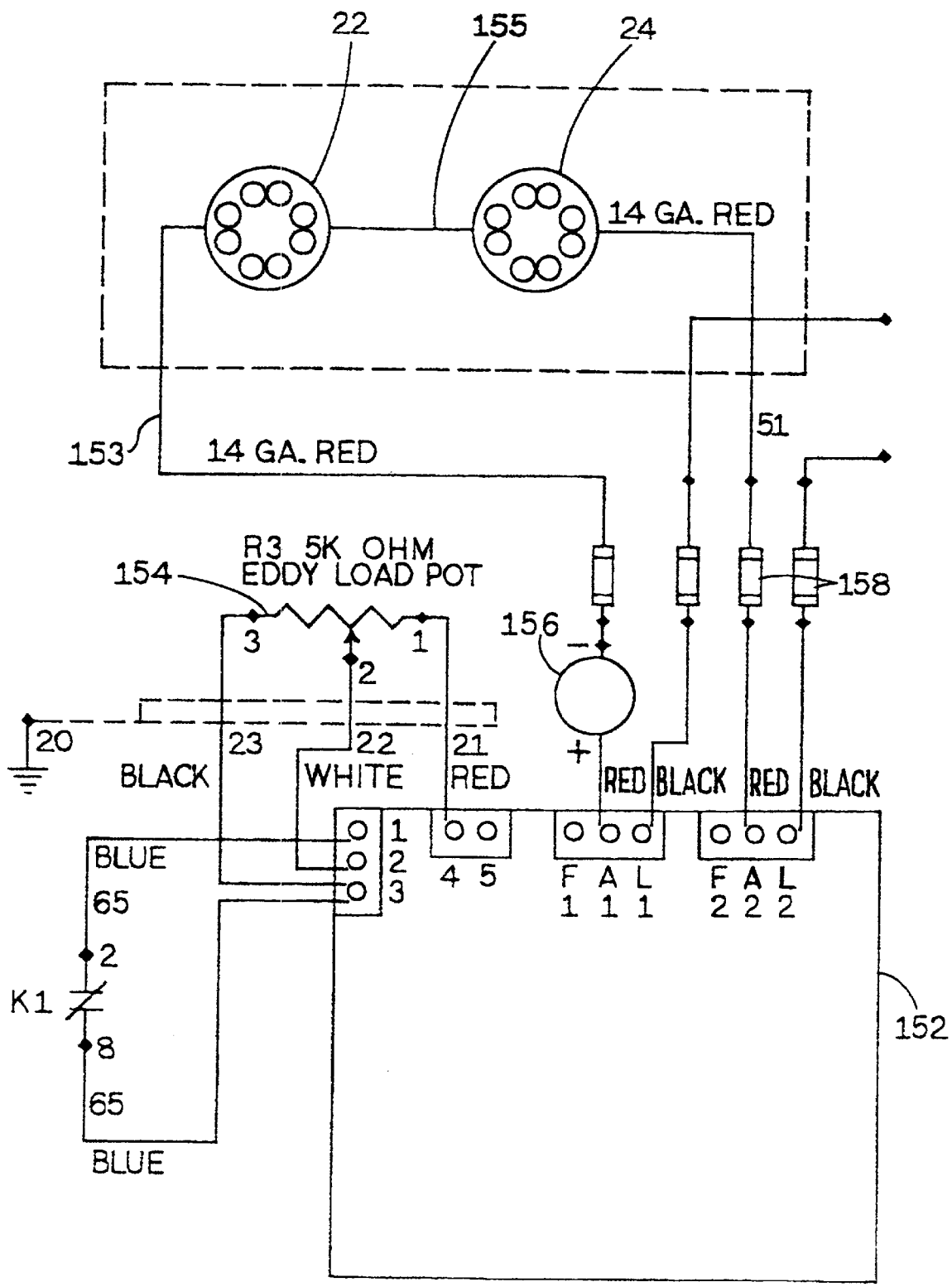
FIG. 8 is a diagrammatic representation of the overall circuit from the brake drive card through the brake units.

Power to the eddy current brakes is conditioned by a variable voltage D.C. motor control drive card. Connections to a preferred motor control drive card 152, available from Extron Company, Minneapolis, Minn., as Snap-Trol Model 181, are shown in FIG. 8. As seen therein, standard nominal 110 volt, or 230 volt, alternating current is received from line at terminals "L1" and "L2." In the card, the current is transformed to 96 volts AC and is converted to 96 volts DC. Potentiometer 154 controls the amperage output of the card. The contacts of normally closed relay K1 open when the potentiometer is set at zero, and generally close when the potentiometer is set at a value greater than zero, whereby relay K1 serves as a mechanical "off" switch when the potentiometer is turned to zero. The thus conditioned electric power leaves the drive card at terminal "A1," passes through ammeter 156, and passes in series through the left and right brake units 22, 24 respectively, thence back to the drive card at terminal A2. The electricity also passes through fuses 158, as appropriate.

Figure 9:
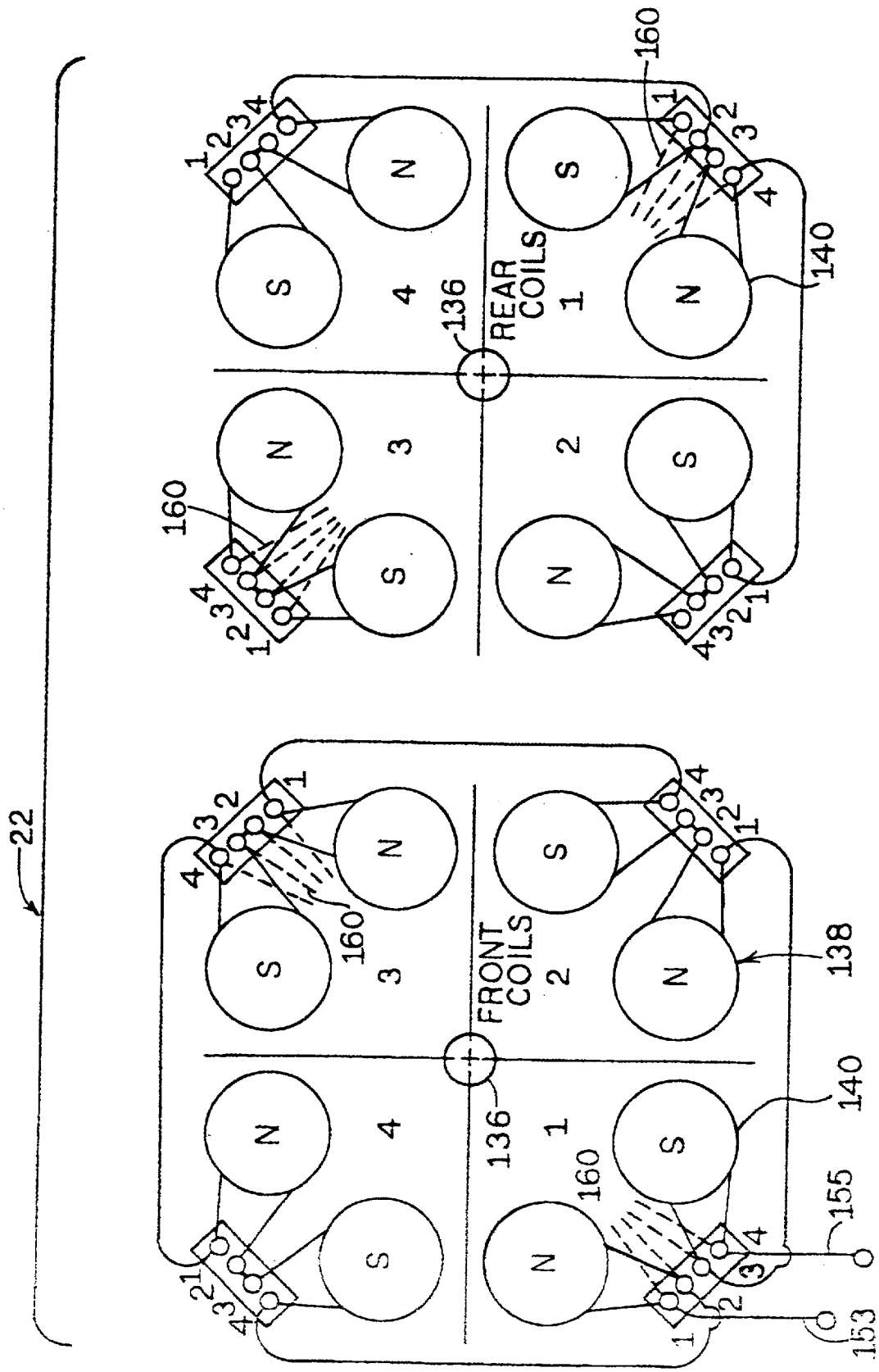
FIG. 9 is a representation of a wiring layout for the electromagnetic stator coils in one of the brake units.
Figure 10:
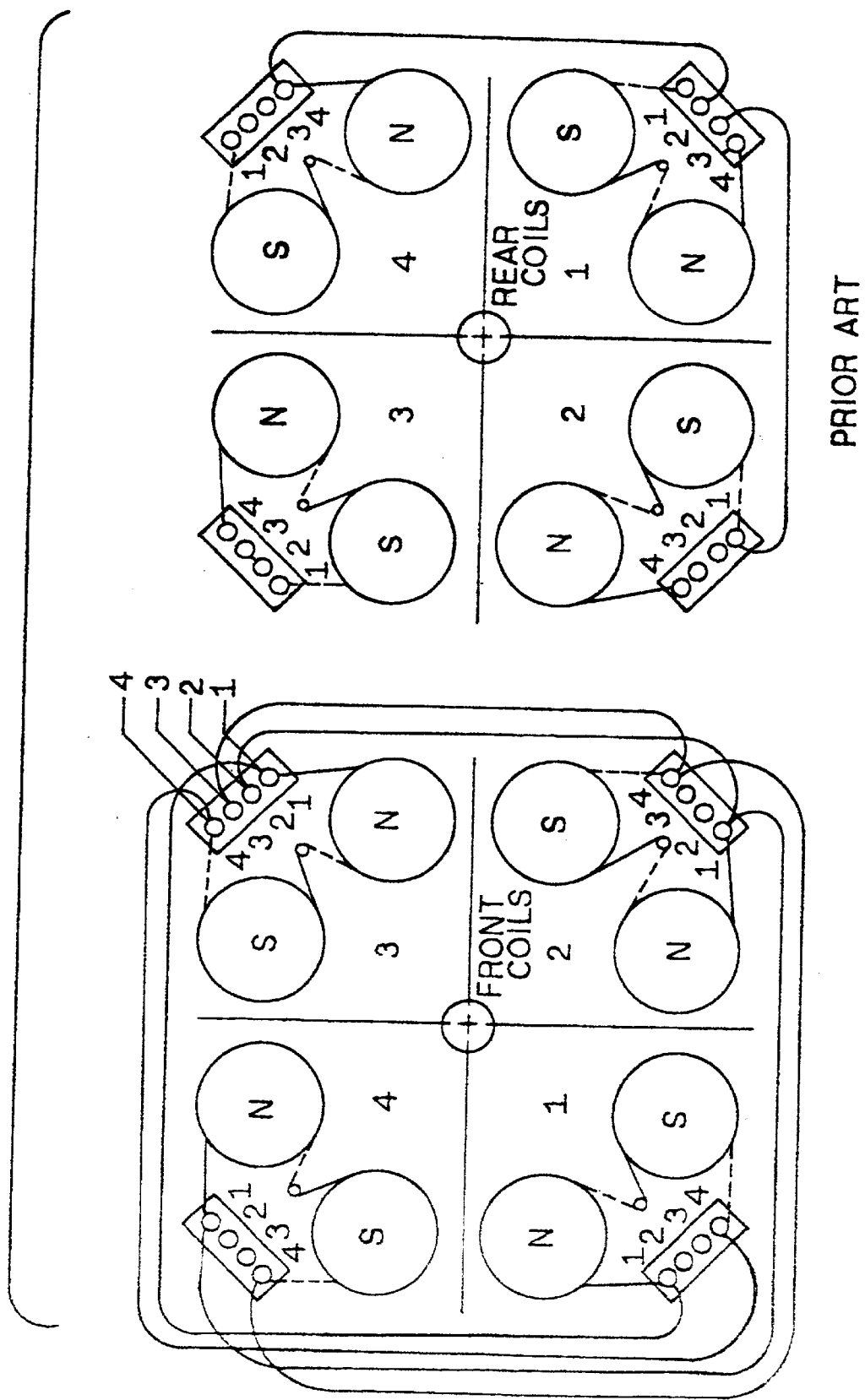
FIG. 10 is a representation of the electromagnetic stator coils in one of the brake units, using a prior art wiring layout.

FIG. 9 shows a representative wiring diagram for a brake unit e.g. brake unit 22. The preferred brake unit is a rewired version of a brake available from American Electro Brake Inc., Roanoke, Va., as the Marty Electric Retarder, manufactured by KALM, Navarre, Spain. As received, each brake unit 22, 24 includes a front set of eight electromagnetic stator coils 140, and a rear set of eight electromagnetic stator coils 140, for a total of sixteen coils 140.

The configuration of the wiring after being rewired according to the preferred embodiment, is shown in FIG. 9. As seen in FIG. 9, the feed line 153 from the Drive Card 152 is received at terminal 1 on the terminal strip at quadrant 1 on the front set of coils on brake unit 22. The wiring then proceeds in series through each coil 140, progressing clockwise about the eight coils in the front set of coils, departing the front set of coils from terminal 4 on the terminal strip at quadrant 1 on the front set of coils, and progressing along line 155 to brake unit 24, where it passes through brake unit 24 in a corresponding wiring pattern.

The rear set of coils on each brake unit is configured the same as the front set, as indicated in FIGS. 8 and 9. Power to the rear coils 140 is fed through wires represented as dashed lines 160 from the terminal strips at quadrants 1 and 3 in FIG. 9, and is received at corresponding terminal strips at quadrants 1 and 3 in the set of rear coils, also shown there as dashed lines 160. As seen in FIG. 9, the wiring then passes from quadrant 1 to quadrants 2 and 4 in parallel, and through each set of coils in the respective quadrants in series. The wires feeding rear quadrant 3 pass through only the two coils in quadrant 3.

A variety of wiring patterns have been successfully used to feed electricity from the front set of coils to the rear set of coils, and for feeding the electricity from and among the quadrants in the rear set of coils. In each case, however, the electricity is fed in series to both coils within a given quadrant, both the coil indicated "N" for North Polarity and the coil indicated "S" for South Polarity. Accordingly, the front-to-back feed could come from as few as one quadrant, or as many as all four quadrants in the front set. Somewhat dependent on the number and distribution of feed terminals, the wiring among the quadrants in the rear set could be a complete series circuit as in the front set, could be fragmented in a balanced pattern, such as quadrants 1 and 2 wired together and 3 and 4 wired together, or could be fragmented in an unbalanced pattern as shown in FIG. 9. It is anticipated that different applications for the brakes may thus suggest from among such wiring patterns to those skilled in the art.

By feeding all coils 140 with a single feed line 153, uniformity of the braking function is improved over separately feeding each of the four opposing pairs of coils in each of the front and rear sets. In order to accommodate the capacity of commonly used potentiometers, as at 154, the commonly used 12 or 24 volts is modified to 96 volts before converting the line alternating current to direct current. Given the 96 volt DC system, commonly available potentiometers can be used to handle the normal 4–5 amps commonly applied to the brakes in operating the transmission testers of the invention. The operator can, through the potentiometer, dynamically vary the amount of electrical power fed to the brake units, and thus the amount of braking torque imposed on the transmission, while the transmission is being tested. Accordingly, any one transmission can be tested at a variety of torque loads, simulating a corresponding variety of vehicle deadweight loads, or the combination of deadweight loads and selected braking loads, by simply manipulating the potentiometer. Thus, any one transmission can be evaluated under any one, or a series, of a range of loadings, where each loading may be a constant load, or may vary in intensity as desired.

Figure 6:
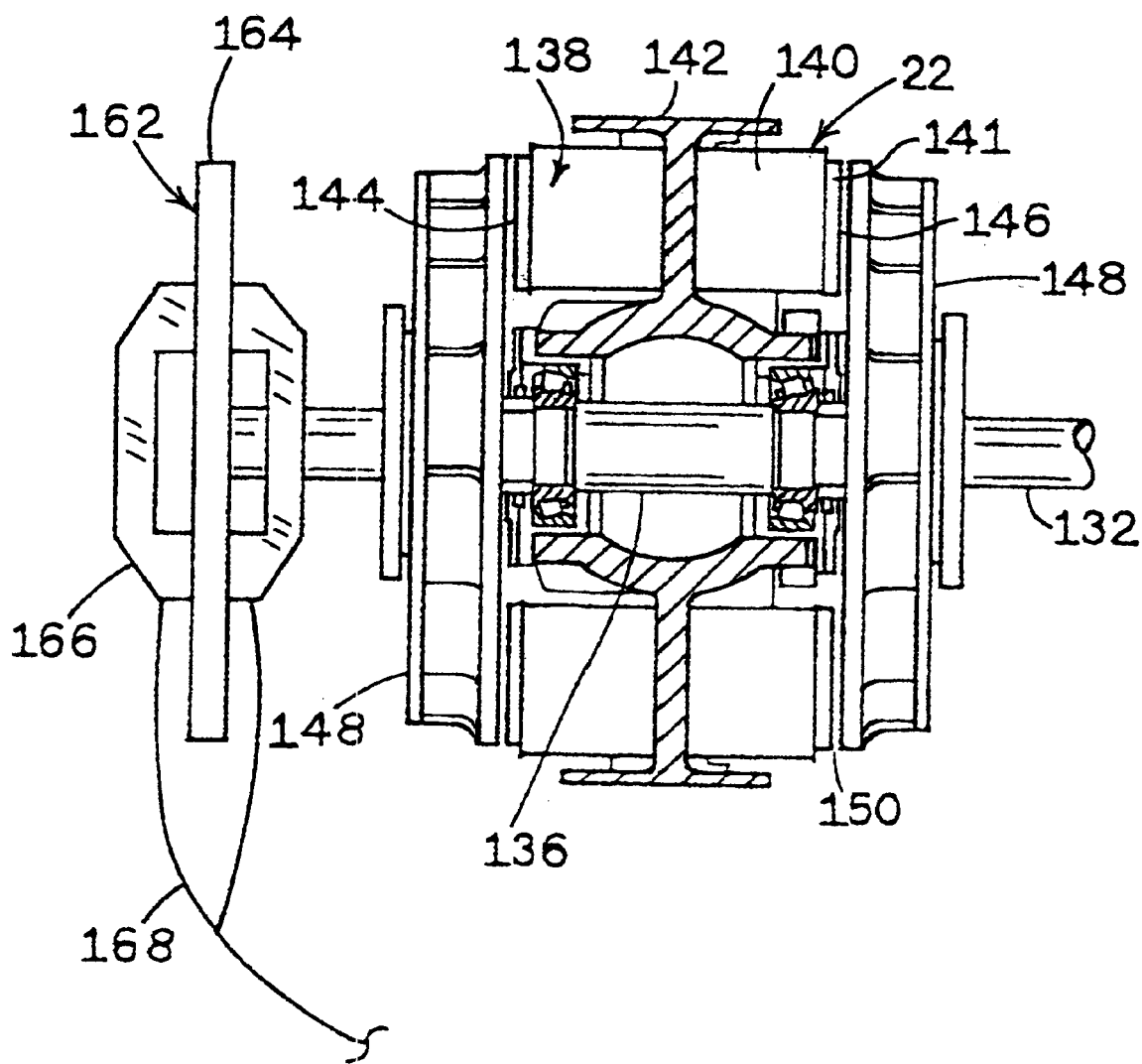
FIG. 6 shows a representative cutaway elevation of the eddy current brake and the stall brake, and is taken at 6—6 of FIG. 1.

As shown in FIG. 6, the left brake unit 22 includes a stall brake 162 mounted for rotation with shaft 136. The stall brake 162 includes a brake disc 164 and a pair of mechanical brake calipers 166 on opposing sides of the disc 164, and connected by hydraulic lines 168 to a brake pedal, not shown, which is manipulated by the operator of the transmission tester 10. Stall brake 162 is used in two specific applications. First, the stall brake is used to hold the shafts 130, 132, and 136 stationary, as required by conventional test procedure, while the routine stall speed test is performed on the transmission. Second, the stall brake is used to assist in final deceleration of the transmission when testing has been completed.

Returning now to FIG. 7, the electronic control unit 64 includes the drive card 152 for controlling the brakes 22, 24. In addition, the electronic control unit 64 includes an inverter 164, for changing the frequency of the alternating current being fed through wire 66 to the electric drive motor 50. For use in testing typical automotive transmissions, electric drive motor 50 is preferably a 30 horsepower motor. Using the inverter 164, the drive speed for driving the transmission can be controlled electronically by using the inverter to vary the frequency fed to the drive motor 50. By properly setting the variable codes on the inverter, one can control, for example, the acceleration time, the deceleration time, the overload time, and amperage draw limitations. Using a Magnetec GDP 503 inverter, from Magnetec, Auto Motion and Drive Products Division, New Berlin, Wis., the following settings are preferred:

| LOCATION | DATA | FUNCTION |
| --- | --- | --- |
| BN-01 | 10.0 | ACCEL TIME 1 |
| BN-02 | 10.0 | ACCEL TIME 1 |
| BN-10 | 2 | MONITOR NO. AFTER POWER-UP |
| BN-11 | 0.50 | PERCENT LOAD METER GAIN |
| SN-01 | OA | KVA (HP) SELECT |
| SN-02 | OF | V/F SELECT |
| SN-03 | 0101 | LOCKS OUT KEYPAD |
| SN-04 | 0000 | OPERATION MODE SELECT 1 |
| SN-05 | 1000 | OPERATION MODE REVERSE RUN |
| SN-07 | 0111 | OVERTORQUE DETECTION |
| CN-01 | 230 | OUTPUT VOLTAGE REGULATOR |
| CN-02 | 103.4 | FREQUENCY - MAX. |
| CN-03 | 230 | VOLTAGE - MAX. |
| CN-09 | 70 | MOTOR RATED CURRENT |
| CN-12 | 1.0 | DC INJECTION TIME AT STOP |
| CN-20 | 03000 | OPERATOR DISPLAY MODE |
| CN-26 | 160 | OVERTORQUE DETECTION LEVEL |
| CN-27 | 20 | OVERTORQUE DETECTION TIME |

All other settings are left at the settings set by the manufacturer.

A further advantage of using an inverter is that, when the inverter detects a spike in the amperage draw, it temporarily suspends the acceleration in the frequency being fed to the motor. In the case of the above discussed Magnetec GDP 503, acceleration is suspended for about 1.5 seconds at the occurrence of an amperage spike.

Each time the transmission shifts gears, it puts a temporary added load on the drive motor 50, inducing just such an amperage spike as triggers the temporary suspension of driving at the inverter. Accordingly, every time the transmission shifts gears, the inverter temporarily reduces the power being fed to the motor, producing a drop in the shaft speed of the transmission of typically about 200–250 revolutions per minute. The inverter thus simulates, for an electric motor, the drop in engine speed which occurs naturally in an internal combustion engine.

The GDP 503 inverter receives its sensed conditions from the shaft speed of the motor. Accordingly, the duration of the suspension of driving by the inverter cannot be easily adjusted. However, by using an inverter which senses changes in torque rather than changes in speed, one can adjust the duration of the suspension of driving. An acceptable such inverter is available, also from Magnetec, under the designation GDP 703.

It is contemplated that the operation and functions of the invention have become fully apparent from the foregoing description of elements, but for completeness of disclosure the usage of the invention will be briefly described.

Referring to FIGS. 1 and 7, and without a transmission installed on the headstock plate 46, the headstock frame 44, with motor 50 being carried thereon, is positioned at the appropriate one of the first position, shown in FIG. 1, or the second position, shown in FIG. 7, depending on the type of transmission to be tested. If the headstock frame needs thus to be repositioned, the locator pin 112 is pulled. The tie-down bolts 118 are taken out of the respective holes 120. The headstock frame is then moved toward the desired position until the locator pin 112 drops into the respective locator hole 116 in the headstock support plate 42. With the locator pin in the respective hole 116, the tie-down bolts are again tightened, securing the headstock frame to the headstock support plate at the selected position. While the first and second positions are illustrated with an included angle of 90 degrees, any desired angle may be used by providing the appropriate holes 116 and 120. Such included angle may be more, or less, than 90 degrees.

With the headstock frame in place at the selected position, a transmission is mounted to the headstock plate 46, in the conventional manner. The output shafts 130 of the transmission are then aligned transversely and vertically with the tailstock shafts 132, and are coupled to the tailstock shafts 132 using couplings 134, as shown in FIGS. 1 and 7. Appropriate hydraulic connections are then made with the transmission, for monitoring its performance as at gauge panel 166. The stall brake 162 is released if not already released. Power is then applied to drive motor 50 through inverter 164, increasing the drive speed, in a test of the operation of the transmission simulating dynamic driving conditions, according to the switch settings previously set in the inverter. As power is applied to the drive motor, and thus to drive the transmission, corresponding braking torque is applied to the load at the brake units 22, 24, to simulate the deadweight load of a vehicle being driven. As desired throughout the test, the load is varied by adjusting the setting of potentiometer 154 to pass more or less current to the electromagnetic stator coils 140 in brakes 22, 24, for example to test the transmission under conditions simulating deceleration of the vehicle under braking conditions.

Either before or after the dynamic test, the transmission is subjected to a stall test. For the stall test, the stall brake is applied, such that the shafts 130, 132, and 136 are prevented from turning. Accordingly, the transmission is forced to operate under stall conditions at its output shafts 130, thus to assess its operation under those stall conditions.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A transmission tester for testing vehicular transmissions, the transmission tester comprising:
   (a) a main frame;
   (b) a prime mover, for providing driving energy to a transmission to be tested;
   (c) a headstock plate adapted to receive thereon a transmission to be tested, said headstock plate being supported from said main frame by a support, said support being mounted for pivotation about a first axis, to thereby pivot said headstock plate about said first axis; and
   (d) loading and braking apparatus, supported from said main frame, said loading and braking apparatus including a shaft journalled for rotation about a second axis substantially perpendicular to said first axis, and extending generally toward said headstock plate, for engaging an output shaft of the transmission to be tested, and for thereby applying braking energy to the transmission.

2. A transmission tester as in claim 1, said support comprising a headstock frame, supported from said main frame, between said main frame and said headstock plate, said headstock frame being pivotable about the first axis, thereby to pivot said headstock plate about said first axis.

3. A transmission tester as in claim 1, said first axis being substantially vertical and said second axis being substantially horizontal.

4. A transmission tester as in claim 2, said first axis being substantially vertical and said second axis being substantially horizontal.

5. A transmission tester as in claim 4, said headstock plate being adapted to face in a first direction along an imaginary line extending toward said loading and braking apparatus, and to pivot about the first axis to thereby face in a second direction transverse to the line extending toward said loading and braking apparatus.

6. A transmission tester as in claim 5, the included angle between the first and second directions being at least about 90 degrees.

7. A transmission tester as in claim 1, said transmission tester having opposing first and second ends, and a length therebetween, said prime mover comprising an electric motor mounted to said support, said support comprising a headstock frame, said headstock frame with said electric motor thereon, being supported from said main frame for movement of the combination of said headstock frame and said electric motor in a direction having a transverse horizontal component relative to the length of said transmission tester.

8. A transmission tester as in claim 1, said support comprising a headstock frame, said prime mover comprising an electric motor mounted to said headstock frame, said headstock frame with said electric motor thereon, being supported from said main frame for movement of the combination of said headstock frame and said electric motor in a direction having a vertical component.

9. A transmission tester as in claim 5, said transmission tester having opposing first and second ends, and a length therebetween, said prime mover comprising an electric motor, mounted to said headstock frame, said headstock frame, with said electric motor thereon, being supported from said main frame for both movement of the combination of said headstock frame and said electric motor in a direction having a vertical component and movement of the combination of said headstock frame and said electric motor in a direction having a transverse horizontal component relative to the length of said transmission tester.

10. A transmission tester as in claim 1, said prime mover comprising an electric motor, and including an inverter adapted to vary the speed of said electric motor, and to temporarily suspend acceleration of the speed of said electric motor when a transmission being tested shifts gears.

11. A transmission tester as in claim 1, said loading and braking apparatus comprising an eddy current device.

12. A transmission tester as in claim 10, said loading and braking apparatus comprising an eddy current device.

13. A transmission tester as in claim 1, said prime mover comprising an electric motor, said motor being mounted for pivotation with respect to said first axis.

14. A transmission tester as in claim 2, said prime mover comprising an electric motor mounted to said headstock frame, said headstock plate being mounted to said headstock frame, said headstock frame pivoting both said prime mover and said headstock plate, in combination, with respect to said first axis.

15. A transmission tester as in claim 7, said prime mover comprising an electric motor mounted to said headstock frame, said headstock plate being mounted to said headstock frame, said headstock frame pivoting both said prime mover and said headstock plate, in combination, with respect to said first axis.

16. A transmission tester as in claim 8, said prime mover comprising an electric motor mounted to said headstock frame, said headstock plate being mounted to said headstock frame, said headstock frame pivoting both said prime mover and said headstock plate, in combination, with respect to said first axis.

17. A transmission tester as in claim 9, said prime mover comprising an electric motor mounted to said headstock frame, said headstock plate being mounted to said headstock frame, said headstock frame pivoting both said prime mover and said headstock plate, in combination, with respect to said first axis.

18. A transmission tester as in claim 10, said prime mover comprising an electric motor mounted to said headstock frame, said headstock plate being mounted to said headstock frame, said headstock frame pivoting both said prime mover and said headstock plate, in combination, with respect to said first axis.

19. A transmission tester for testing vehicular transmissions having at least one transmission output element, said transmission tester comprising:
   (a) a main frame;
   (b) a prime mover, for providing driving energy to a transmission to be tested;
   (c) a headstock plate, supported from said main frame, for receiving thereon transmissions to be tested; and
   (d) loading and braking apparatus, supported from said main frame, said loading and braking apparatus comprising a connecting shaft journalled for rotation about a first axis, and for applying loading energy to transmissions to be tested, said loading and braking apparatus applying, to the at least one transmission output element of the respective transmissions being tested, a range of resistance loads simulating dynamic driving conditions.

20. A transmission tester as in claim 19, said loading and braking apparatus comprising an eddy current brake.

21. A transmission tester as in claim 20, and including an electrical control unit adapted to receive alternating current up to 230 volts, to transform the alternating current to 96 volts, to convert the 96 volt alternating current to 96 volts direct current, and to apply the 96 volt direct current to said eddy current brake.

22. A transmission tester as in claim 21, and including means for controlling, and changing, amperage from said electrical control unit, and thus to said eddy current brake.

23. A transmission tester as in claim 19, said prime mover comprising an electric motor, and including an inverter adapted to vary the speed of said electric motor, and to temporarily suspend acceleration of the speed of said electric motor when a transmission being tested shifts gears.

24. A transmission tester as in claim 21, said prime mover comprising an electric motor, and including an inverter adapted to vary the speed of said electric motor, and to temporarily suspend acceleration of the speed of said electric motor when a transmission being tested shifts gears.

25. A transmission tester as in claim 20, including a stall brake, for locking said connecting shaft of said eddy current brake against rotation about said first axis.

26. A method of testing a vehicular transmission, the method comprising the steps of:
   (a) providing a transmission tester having a main frame, a prime mover, for providing driving energy to a transmission to be tested, a headstock plate adapted to receive thereon a transmission to be tested, the headstock plate being supported for pivotation from the main frame by a support, said support pivoting the headstock plate about a first axis, and loading and braking apparatus, supported from the main frame, the loading and braking apparatus including a shaft journalled for rotation about a second axis substantially perpendicular to the first axis, and extending generally toward the headstock plate, for engaging an output shaft of the transmission to be tested, and for thereby applying braking energy to the transmission;
   (b) mounting, to the headstock plate, a transmission to be tested; and
   (c) as necessary, pivoting the headstock plate about the first axis to bring the output shaft on the transmission into alignment with the shaft on the loading and braking apparatus.

27. A method as in claim 26, the support comprising a headstock frame, supported from the main frame, between the main frame and the headstock plate, the headstock frame being mounted for pivoting about the first axis, the method thereby comprising pivoting the headstock frame to effect the pivoting of the headstock plate about the first axis.

28. A method as in claim 26, the first axis being substantially vertical and the second axis being substantially horizontal, the method thus comprising pivoting the headstock plate about a substantially vertical axis.

29. A method as in claim 26, the method comprising facing the headstock plate in a first direction along an imaginary line extending toward the braking unit, and pivoting the headstock plate about the first axis to thereby face in a second direction transverse to the line extending toward the braking unit.

30. A method as in claim 29, including pivoting the headstock plate about an included angle between the first and second directions of at least about 90 degrees.

31. A method as in claim 26, the support comprising a headstock frame, supported from the main frame, between the main frame and the headstock plate, the headstock frame being mounted for pivotation about the first axis, the transmission tester having first and second ends, and a length therebetween, the prime mover comprising an electric motor, mounted to the headstock frame, the headstock frame, with the electric motor thereon, being supported from the main frame for both movement of the combination of the headstock frame and the electric motor in a direction having a vertical component and movement of the combination of the headstock frame and the electric motor in a direction having a transverse horizontal component relative to the length of the transmission tester, the method further comprising pivoting the combination of the headstock frame and the electric motor about the first axis, and moving the combination of the headstock frame and the electric motor in one or more directions comprising movement having both vertical and horizontal components.

32. A method as in claim 26, the prime mover comprising an electric motor, the method further comprising supplying electric power to the electric motor and thereby driving a transmission being tested at an accelerating speed, including conditioning the electric power in an inverter and thereby increasing the speed of the electric motor, and, through the inverter, temporarily suspending acceleration of the speed of the electric motor when the transmission shifts gears.

33. A method as in claim 26, the loading and braking apparatus comprising an eddy current brake, adapted to apply resistance torque to the transmission within a range of available torque values, the method comprising selecting a torque value as part of testing each transmission, and applying the selected braking torque to the transmission by utilizing eddy current power.

34. A method as in claim 32, the loading and braking apparatus comprising an eddy current brake, adapted to apply resistance torque to the transmission within a range of available torque values, the method comprising selecting a torque value as part of testing each transmission, and applying the selected braking torque to the transmission by utilizing eddy current power.

35. A method as in claim 26, the prime mover comprising an electric motor, mounted to the support, the support comprising a headstock frame, the headstock plate being mounted to the headstock frame, the method including pivoting both the prime mover and the headstock plate, in combination, with respect to the first axis.

36. A method of testing vehicular transmissions, the method comprising the steps of:
   (a) providing a transmission tester having a main frame, a prime mover, for providing driving energy to a transmission to be tested, a headstock plate adapted to receive thereon a transmission to be tested, the headstock plate being supported from the main frame, and loading and braking apparatus, supported from the main frame, the loading and braking apparatus including a connecting shaft journalled for rotation about a first axis, and for applying braking energy to a transmission;
   (b) mounting, to the headstock plate, a transmission to be tested, the transmission having at least one output element;
   (c) connecting the output element of the transmission to the connecting shaft of the loading and braking apparatus;
   (d) applying energy from the prime mover to thereby drive the transmission; and
   (e) applying electrical energy to the loading and braking apparatus in conduct of a test of the transmission, and thereby applying braking torque to the transmission output element, and varying the amount of electrical energy applied to the loading and braking apparatus, such that a range of resistance loads, simulating dynamic driving conditions, is applied to the transmission.

37. A method as in claim 36, the method including receiving, in an electrical control unit, alternating current up to 230 volts, transforming the alternating current to 96 volts, converting the 96 volt alternating current to 96 volts direct current, and applying the 96 volt direct current to an eddy current brake to thereby apply eddy current power, as the braking torque, to the transmission output element.

38. A method as in claim 37, including controlling, and changing, amperage from the electrical control unit, and thus to the eddy current brake, and thereby applying a controlled, and changing amount of braking torque to the transmission.

39. A method as in claim 36, the prime mover comprising an electric motor, the method further comprising supplying electric power to the electric motor and thereby driving the transmission at an accelerating speed, including conditioning the electric power in an inverter and thereby increasing the speed of the electric motor, and, through the inverter, temporarily suspending acceleration of the speed of the electric motor, and thereby the speed of the transmission, when the transmission shifts gears.

40. A method as in claim 38, the prime mover comprising an electric motor, the method further comprising supplying electric power to the electric motor and thereby driving the transmission at an accelerating speed, including conditioning the electric power in an inverter and thereby increasing the speed of the electric motor, and, through the inverter, temporarily suspending acceleration of the speed of the electric motor, and thereby the speed of the transmission, when the transmission shifts gears.

41. A method as in claim 36, the transmission tester including a stall brake, the loading and braking apparatus comprising an eddy current brake, the method including applying the stall brake, and thereby locking the connecting shaft of the eddy current brake against rotation about the first axis.

42. A transmission tester as in claim 1, said pivotation of said headstock plate about said first axis permitting mounting and testing of a longitudinally mounted transaxle transmission.

43. A transmission tester as in claim 1, said loading and braking apparatus comprising an electronic control unit for dynamically varying resistance loads applied to transmission outputs by the loading and braking apparatus, to simulate dynamic driving conditions, while the transmission is being tested.

44. A transmission tester as in claim 43, said electronic control unit including a potentiometer varying the resistance loads applied to the transmission outputs to simulate dynamic driving conditions.

45. A transmission tester as in claim 19, said loading and braking apparatus comprising an electronic control unit for dynamically varying the resistance loads applied to the transmission outputs to simulate dynamic driving conditions, while the transmission is being tested.

46. A transmission tester as in claim 45, said electronic control unit including a potentiometer varying the resistance loads applied to the transmission outputs to simulate dynamic driving conditions.

47. A method as in claim 36, the loading and braking apparatus including an eddy current brake, such that the applying of electrical energy to the loading and braking apparatus includes applying eddy current power to the eddy current brake.

48. A transmission tester for testing vehicular transmissions, the transmission tester comprising:
(a) a main frame supported from a base;
(b) a prime mover, for providing driving energy to a transmission to be tested;
(c) a headstock plate adapted to receive thereon a transmission to be tested, said headstock plate being supported from said main frame by a support; and
(d) loading and braking apparatus, supported from said main frame, for engaging an output shaft of the transmission to be tested, and for thereby applying braking energy to the transmission, said loading and braking apparatus further comprising a direct current motor control, said motor control (i) receiving alternating current up to 230 volts, (ii) transforming the alternating current to a lower voltage alternating current, (iii) converting the lower voltage alternating current to direct current, and (iv) supplying the direct current to a brake.

49. A transmission tester as in claim 48, said brake comprising an eddy current brake.

50. A transmission tester as in claim 49, the lower voltage alternating current being at 96 volts and the direct current being at 96 volts.

51. A transmission tester for testing vehicular transmissions, the transmission tester comprising:
(a) a main frame;
(b) a prime mover, for providing driving energy to a transmission to be tested;
(c) a headstock plate adapted to receive thereon a transmission to be tested;
(d) a support supporting said headstock plate from said main frame; and
(e) loading and braking apparatus supported from said main frame, for applying braking energy to the transmission being tested, said support and said headstock plate having adjustment elements enabling adjustment of said headstock plate such that transversely mounted transaxles, longitudinally mounted transaxles, and rear wheel drive transmissions can be mounted, and tested, on said transmission tester.

52. A transmission tester as in claim 51, said support being mounted for pivotation about a first axis, to thereby pivot said headstock plate about said first axis.

53. A transmission tester as in claim 51, said loading and braking apparatus including a shaft journalled for rotation about an axis, and extending generally toward said headstock plate, for engaging an output shaft of a transmission to be tested, and for thereby applying braking energy to the transmission.

54. A transmission tester as in claim 51, said support comprising a headstock frame, supported from said main frame.

55. A transmission tester as in claim 54, said prime mover comprising an electric motor, mounted to said headstock frame, said headstock frame, with said electric motor thereon, being supported from said main frame for movement of the combination of said headstock frame and said electric motor in a direction having a vertical component.

56. A transmission tester as in claim 52, said first axis being directed toward said base.

* * * * *

UNITED STATES PATENT AND TRADEMARK OFFICE
CERTIFICATE OF CORRECTION

PATENT NO. : 6,343,504 B1  Page 1 of 1
DATED : February 5, 2002
INVENTOR(S) : Shultz It is certified that error appears in the above-identified patent and that said Letters Patent is hereby corrected as shown below:

<u>Title page,</u>
Item [*], insert -- [*] Notice: Under 35 U.S.C. 154(b), the term of this patent shall be extended for 1271 days. --.

Signed and Sealed this

Twenty-fifth Day of March, 2003

JAMES E. ROGAN
*Director of the United States Patent and Trademark Office*